United States Patent [19]

Norlund

[11] Patent Number: 4,952,230

[45] Date of Patent: Aug. 28, 1990

[54] METHOD OF BRINGING GASES INTO CONTACT WITH COMPOSTIBLE MATERIAL OR PARTIALLY COMPOSTED MATERIAL, AND AN ARRANGEMENT FOR CARRYING OUT THE METHOD

[75] Inventor: Tore Norlund, Torshälla, Sweden

[73] Assignee: Armerad Betong Vageorbattringar AB, Stockholm, Sweden

[21] Appl. No.: 617,935

[22] Filed: Jun. 6, 1984

Related U.S. Application Data

[63] Continuation of Ser. No. 270,990, Jun. 5, 1984, abandoned.

[51] Int. Cl.$^5$ ............................. C05F 7/00; C05F 9/04
[52] U.S. Cl. ............................................. 71/9; 71/13; 71/14
[58] Field of Search .................................. 71/11-14, 71/8-10, 24, 64.13, 901

[56] References Cited

U.S. PATENT DOCUMENTS 3,138,449  6/1964  Renfro ................................... 71/24
4,317,671  3/1982  Willisch ................................... 71/9

Primary Examiner—Ferris H. Lander
Attorney, Agent, or Firm—Fred Philpitt

[57] ABSTRACT

A method for bringing gases into contact with compostible or partially composted material, in which the material placed in the form of a mass on a layer of particulate material and gas, preferably air, is passed through the material, the air being introduced into the mass through gas-distributing means embedded in or covered by the layer of particulate material, and in which the layer comprises a first part-layer of relatively coarse particulate material intended to serve as protection for the gas-distributing means and as a distributing filter for the through-flowing gas, and a second part-layer arranged upon the first part-layer and comprising relatively fine particulate material, the second part-layer being intended to distribute the through-flowing gas before the gas is introduced into the compostible or partially composted material. The second part-layer of the layer comprises a mixture of the relatively fine particulate material, as ballast material, and a binding agent and has such a particle size distribution and the ingredients are present in such mixing proportions that the second part-layer obtains an open porous structure having a pressure drop suitable for uniform gas distribution while, at the same time, being able to withstand the weight of heavy vehicles.

14 Claims, 1 Drawing Sheet

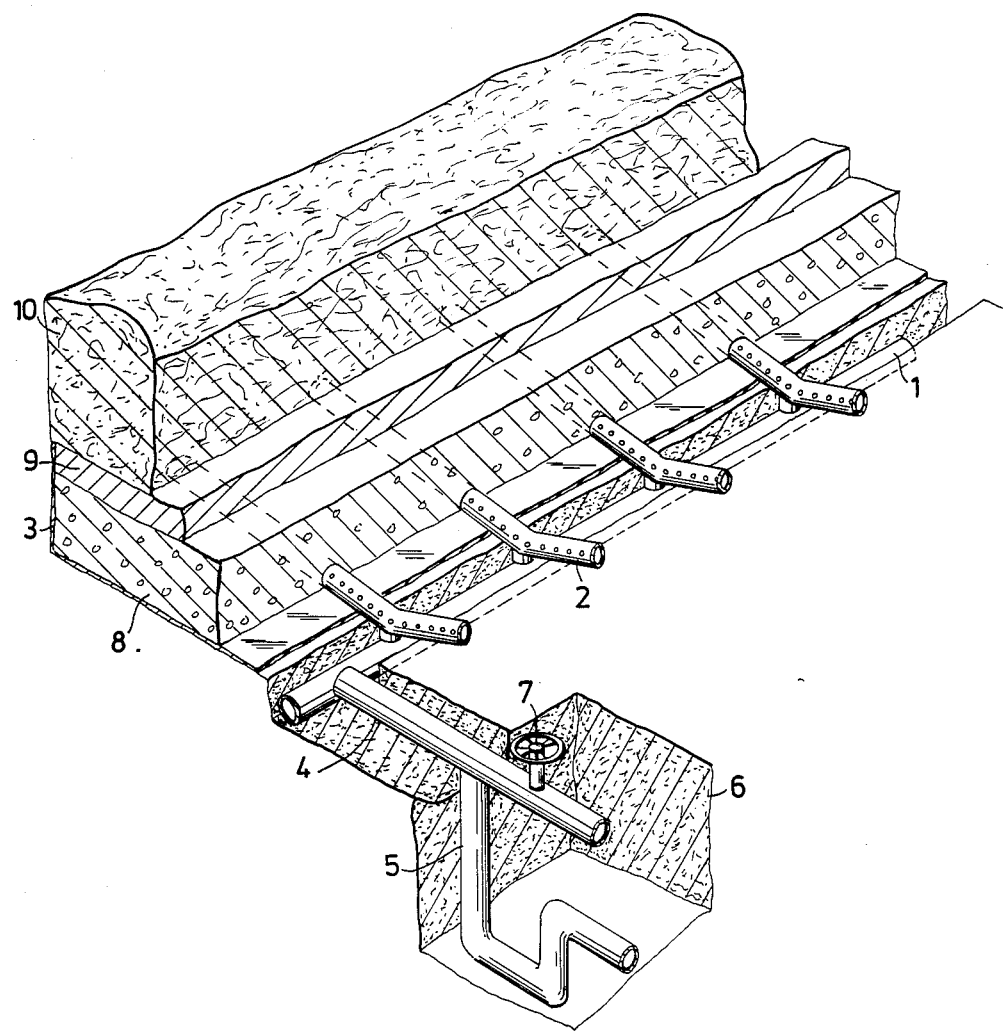

METHOD OF BRINGING GASES INTO CONTACT WITH COMPOSTIBLE MATERIAL OR PARTIALLY COMPOSTED MATERIAL, AND AN ARRANGEMENT FOR CARRYING OUT THE METHOD

This is a continuation of application Ser. No. 270,990, filed June 5, 1981 and now abandoned and the benefits of 35 USC 120 are claimed relative to it.

The present invention relates to a method of bringing gases into contact with compostible material or partially composted material, and an arrangement for carrying out the method.

More specifically, the present invention relates to a method of bringing gases into contact with compostible or partially composted material in which said material has the form of a mass resting on a layer of particulate material and is through-passed by gas, preferably air, introduced into said mass through gas-distributing means embedded in or covered by said layer of particulate material, and in which the layer comprises a first part-layer of relatively coarse particulate material intended to protect the gas-distributing means and to serve as a distribution filter for the through-flowing gas, and a second part-layer located on said first part-layer and comprising relatively fine particulate material, said further part-layer being intended to distribute said through-flowing gas prior to said gas being introduced into the compostible or partial composted material.

The purpose of bringing gas, preferably air, into contact with compostible material or partially composted material is either to compost said material or to subject partially composted material to a subsequent composting effect, or to purify contaminated air, e.g. air containing obnoxious gases, with the aid of a filter comprising partially composted material (bio-filter).

By "compostible material" is meant preferably a mixture of waste material such as domestic waste, bark, sawdust, woodchips or the like, or organic material having a certain fuel value such as peat or similar fossile material, and a material containing microorganisms, such as sludge obtained from sewage purification plants.

A method according to the aforegoing constitutes part of the present state of the art (see published Swedish patent application No. 7809701-1). One disadvantage with the known method is that it is difficult to remove the composted material, for example by means of wheel-mounted loaders, from the layer of particulate non-composted material without part of said non-composted material accompanying said composted material and contaminating the same. As a result of the action of the overlying material undergoing treatment, the function of the other part-layer to provide uniform distribution of the air coming from beneath can be impaired. A further serious disadvantage is that a layer of material undergoing treatment in accordance with present day methods cannot, without disadvantage, be subjected to the weight of a working tool or vehicle. As will be understood, an important advantage is to be gained from a handling aspect if such tools and vehicles are able to operate over a wider area, which also includes the under-layers of composted material.

It has now been found that the aforementioned disadvantages can be eliminated or substantially reduced when the second part-layer is formed of a mixture of said relatively fine particulate material and a binding agent, whereat the fine particulate material serves as ballast in the concrete formed. It is essential that the amount of binder added is so adjusted and the particle size of the particulate material so distributed that the part-layer obtains an open porous structure, so as to be gas permeable and permit the passage of leaching water and/or drained water therethrough.

To one of normal skill in this art having knowledge of the aforegoing it should be a relatively simple matter, possibly after making suitable experiments, to establish suitable proportions between the ballast material and the binding agent and a suitable particle size distribution of the ballast material selected in each particular case. By combining relatively coarse particulate material, for example gravel, in the first part-layer, and a concrete according to the above in the second part-layer, it is possible to obtain a foundation capable of withstanding the very heavy loads created by handling equipment and vehicles, and which at the same time fulfils requirements with regard to its ability to allow gas and liquid to pass there-through.

The coarse particulate material used to form the first part-layer, i.e. the part-layer which is in contact with the gas-distributing means, may principally comprise any inexpensive material whatsoever, such as gravel, crushed slag, crushed light-weight concrete, macadam etc. The thickness of the part-layer should be such as to provide satisfactory support and satisfactory protection. The second part-layer of concrete has a greater flow resistance than the first part-layer. Thus, the gas introduced will spread over the whole area of the layer.

The composite layer used according to the invention enables gas, preferably air, to be supplied to the mass of combustible or partially combusted material in a more uniform manner. In this way, the risk of ill-smelling gases entering the surrounding atmosphere is reduced. Consequently, the composition of organic material basic to the composting process is very complete and, furthermore, takes place more quickly.

By using a mixture of fine particulate material and binding agent as material for the second part-layer, further improved draining of the material being composted is achieved. Because the layer becomes completely rigid or stiff, the concrete retains its open porous structure, so that water is able to pass freely to the gas-distributing means through which the water can run to collecting drains. To this end, the gas-distributing means may be inclined to the horizontal in a known manner, thereby further facilitating the drainage of the water.

The invention also relates to an arrangement for carrying out the method. The arrangement is of the kind which comprises a layer of particulate material and gas-distributing means for introducing gas into a mass of compostible or partially composted material resting on said layer, said layer comprising a first part-layer of relatively coarse particulate material intended to serve as protection for the gas-distributing means and as a distribution filter for the gas introduced into said mass and flowing therethrough, and a second part-layer arranged on top of the first part layer and comprising relatively fine particulate material. The arrangement is characterized in that the second part-layer is formed of a mixture of the relatively fine particulate material, as a ballast material, and binding agent, the fine particulate material having such a particle size distribution and the constituents being present in the mixture in such relationship that said layer obtains an open porous structure with a suitable pressure drop for uniform gas distribution, while being capable at the same time to withstand the weight of heavy vehicles.

According to one embodiment of the arrangement according to the invention, the gas-distributing means have the form of perforated pipes which rest on the ground and which are inclined slightly towards a drainage means for leading drainage water and/or leaching water away from the mass of compostible or partial pomposted material. The drainage means may suitably comprise a collector line for distributing air to the perforated pipes.

In accordance with a further embodiment of the invention, the drainage means extending from the pipe or pipes serving as gas-distributing means, may be connected, via a respective further pipe, to a source of gas, preferably air, for example a powerful fan or blower, and to a drain collecting drainage and/or leaching water. In this respect, a pipe leading to the drain may have a portion arranged to serve as a liquid trap or seal.

The second part-layer suitably comprises asphalt concrete. Other material may be used, however, particularly lightweight ballast concrete, which comprises particles of expanded clay bound together with cement or a plastics substance.

The invention will now be described in more detail with reference to the accompanying drawing, in which FIG. 1 is a perspective view of an arrangement for the final composting of partially composted material (waste and sludge) and FIG. 2 is a cut-away view of the arrangement illustrated in FIG. 1.

With reference to FIG. 1, the first step taken when practising the present invention is to first excavate and terrace a suitable piece of ground, to form a suitable pit having a relatively long extension in the plane of the ground. The pit is then divided into sections, and in each section there is arranged a main pipe 1 in a chute at the bottom of said section. The drawing illustrates one such section. Extending from each main pipe is a plurality of perforated branch pipes 2, which are inclined slightly towards the location at which they are connected to the main pipe. The walls of the pit are then covered with a layer 3 of dense material, e.g. thermoplastic foil. The main pipe 1 is connected, via a pipe 4 buried in the ground, to a source of air supply (fan or some other form of blowing device), and to a branch pipe 5 which leads to a drain 6 provided with a water trap. The water trap has been produced by bending an end part of the pipe 5 into a U-shape. That part of the buried pipe which extends to the fan has a valve 7 for controlling the supply of air to the main pipe 1 and the branch pipes 2. During those periods when air is supplied for composting purposes, the water trap acts as a pressure regulator.

The arrangement of perforated pipes in the bottom of the pit is covered with a first layer 8 of relatively coarse particulate material, said layer being intended to protect the air-distributing means and to serve as a distributing filter for the air supplied through the pipe arrangement. The coarse particulate material comprises macadam which, with respect to particle size distribution, has been given such properties that the filter layer 8 is able to withstand the weight of machines and vehicles located on a second part-layer 9 of relatively fine particulate material which is bound with asphalt to form asphalt concrete.

Ballast material in the asphalt concrete has such particle size distribution and the concrete such composition that the second part-layer 9 obtains an open porous structure and permits air blown by the fan to pass through the underground system of pipes and the perforated gas-distributing pipes 2. In this respect, the counterpressure in the second layer 9 shall be such that uniform distribution of air is obtained over the whole of the surface of the mass 10 of compostible material lying against the foundation surface, and that the counter pressure in said mass is negligible in relation to the counterpressure in the second part-layer. The second part-layer is of such strength as to enable heavy vehicles and machines to move on said surface without causing damage thereto.

EXAMPLE

The first part-layer comprised so-called gravel in the form of a fraction which included particle sizes between 8 and 16 mm, the thickness or height of the layer being about 30 cm.

The second part-layer was a mixture of (1) 15 per cent of a relatively coarse macadam having particle sizes between 16 and 25 mm, (2) 42 per cent of sand having particle sizes between 0 and 2 mm and (3) 43 per cent of a limestone filler having particle sizes beneath about 0.25 mm.

An aqueous asphalt emulsion containing about 30% asphalt and having a softening temperature of between 46 and 49° C. was added to the resultant mixture in an amount such that the binding agent content of said mixture (calculated on the dry weight of said mixture) was 4.0%.

Subsequent to spreading the mixture over a surface to form a layer having a thickness of 15–20 cm and permitting the mixture to solidify, the resistance of the layer to gas passing therethrough was about 400 mm water column a value which is very suitable for distributing gas forced through the layer with the aid of a fan, uniformly over a wide surface covered with compostible material.

In practice this surface may cover 250–300 $m^2$. The layer was able to withstand the load of conventional working equipment for transporting and turning the composting material. The material was also so porous that water which had collected on the surface, e.g. rain water, could readily drain through said material.

Two further batches of material containing 4.5 and 5.0% binder, respectively, were also produced. The latter batches of material comprised asphalt similar to that above. An extremely good result was also obtained in this case.

I claim:

1. A method for composting which comprises
    (a) establishing a mostly horizontal network of pipes in excavated earth which can serve the dual functions of introducing air and removing liquids,
    (b) covering at least the uppermost portion of said network of pipes with a first layer composed of relatively coarse particulate material, which material serves to protect the network of pipes and acts as a distributing filter for the air exiting from said network of pipes,
    (c) covering said first layer with a second layer of less coarse particulate material in the form of asphalt concrete said second layer acting as a further distributing filter for the air passing upwardly thru said first layer,
    (d) said second layer containing a binding agent which will bind the particulate material in said second layer together sufficiently so that said second layer will have enough rigidity to support the weight of heavy vehicles thereon while at the same time retaining sufficient porosity in said second layer so that air can be forced upwardly therethrough and liquid can drain downwardly therethrough, (e) travelling over the upper surface of said second layer with appropriate conventional working vehicles so as to deposit compostible material on the upper surface of said second layer, (f) forcing air through said network of pipes and upwardly through said porous first and second layers to promote composting of said deposited compostible material, (g) allowing any liquid in said deposited compostible material to drain downwardly through said compostible material, then downwardly through said second and first layers and outwardly through said network of pipes, and (h) travelling over the upper surface of said second layer with appropriate conventional working vehicles to turn the composting material and/or remove composted material that is resting on the upper surface of said second layer.

2. The method according to claim 1 wherein the gas flow resistance in said second layer, considered in a direction at right angles to the main plane of the said layer, being higher than the gas flow resistance in said first layer and the gas flow resistance in the mass of compostible material resting on the upper surface of said second layer being negligible in relation to the gas flow resistance of second layer.

3. A method according to claim 1 wherein said first layer is selected form the group consisting of gravel, crushed slag, crushed light-weight concrete and macadam.

4. A method according to claim 1 wherein said working vehicle is a wheel mounted loader.

5. A method for composting which comprises
(a) establishing a mostly horizontal network of pipes in excavated earth which can serve the dual functions of introducing air and removing liquids,
(b) covering at least the uppermost portion of said network of pipes with a first layer composed of relatively coarse particulate material, which material serves to protect the network of pipes and acts as a distributing filter for the air exiting from said network of pipes,
(c) covering said first layer with a second layer of less coarse particulate material composed of light-weight ballast concrete, said second layer acting as a further distributing filter for the air passing upwardly thru said first layer,
(d) said second layer containing a binding agent which will bind the particulate material in said second layer together sufficiently so that said second layer will have enough rigidity to support the weight of heavy vehicles thereon while at the same time retaining sufficient porosity in said second layer so that air can be forced upwardly therethrough and liquid can drain downwardly therethrough,
(e) travelling over the upper surface of said second layer with appropriate conventional working vehicles so as to deposit compostible material on the upper surface of said second layer,
(f) forcing air through said network of pipes and upwardly through said porous first and second layers to promote composting of said deposited compostible material,
(g) allowing any liquid in said deposited compostible material to drain downwardly through said compostible material, then downwardly through said second and first layers and outwardly through said network of pipes, and
(h) travelling over the upper surface of said second layer with appropriate conventional working vehicles to turn the composting material and/or remove composted material that is resting on the upper surface of said second layer.

6. The method according to claim 5 wherein the gas flow resistance in said second layer, considered in a direction at right angles to the main plane of the said layer, being higher than the gas flow resistance in said first layer, and the gas flow resistance in the mass of compostible material resting on the upper surface of said second layer being negligible in relation to the gas flow resistance of second layer.

7. A method according to claim 5 wherein said first layer is selected from the group consisting of gravel, crushed slag, crushed light-weight concrete and macadam.

8. A method according to claim 5 wherein said second layer is composed of light-weight ballast concrete in the form of particles of expanded clay bound together with cement.

9. A method according to claim 5 wherein said working vehicle is a wheel mounted loader.

10. A method for composting which comprises
(a) establishing a generally horizontal array of pipes which can serve the dual functions of introducing air and removing liquids,
(b) covering at least the uppermost portion of said array of pipes with a first layer composed of relatively coarse particulate material, which material serves to protect the array of pipes and acts as a distributing filter for the air exiting from said array of pipes,
(c) covering said first layer with a second layer of less coarse particulate material said second layer acting as a further distributing filter for the air passing upwardly thru said first layer,
(d) incorporating into said second layer a binding agent which will bind the particulate material in said second layer together suffuciently so that said second layer will have enough rigidity to support the weight of heavy vehicles thereon while at the same time retaining sufficient porosity in said second layer so that air can be forced upwardly therethrough and liquid can drain downwardly therethrough,
(e) travelling over the upper surface of said second layer with appropriate conventional working vehicles so as to deposit compostible material on the upper surface of said second layer,
(f) forcing air through said array of papers and upwardly through said porous first and second layers to promote composting of said deposited compostible material,
(g) allowing any liquid in said deposited compostible material to drain downwardly through said compostible material, then downwardly through said second and first layers and outwardly through said array of pipes, and (h) travelling over the upper surface of said second layer with appropriate conventional working vehicles to turn the composting material and/or remove composted material that is resting on the upper surface of said second layer.

11. The method according to claim 10 wherein the gas flow resistance in said second layer, considered in a direction at right angles to the main plane of the said layer, being higher than the gas flow resistance in said first layer, and the gas flow resistance in the mass of compostible material resting on the upper surface of said second layer being negligible in relation to the gas flow resistance of second layer.

12. A method according to claim 10 wherein said first layer is selected from the group consisting of gravel, crushed slag, crushed light-weight concrete and macadam.

13. A method according to claim 10 wherein said second layer is composed of light-weight ballast concrete in the form of particles of expanded clay bound together with cement.

14. A method according to claim 10 wherein said working vehicle is a wheel mounted loader.

* * * * *

UNITED STATES PATENT AND TRADEMARK OFFICE
CERTIFICATE OF CORRECTION

PATENT NO. : 4,952,230
DATED : 8/28/90
INVENTOR(S) : Nordlund

It is certified that error appears in the above-identified patent and that said Letters Patent is hereby corrected as shown below:

ON THE TITLE PAGE

Item [19] "Norlund" should read --Nordlund--.

Item [75] "Tore Norlund" should read --Tore Nordlund--.

Item [30] Please insert the priority data
June 6, 1980  SE  Sweden ..... 8004265-8

Item [63] "June 5, 1984" should read --June 5, 1981--.

Signed and Sealed this

Eighteenth Day of February, 1992

Attest:

HARRY F. MANBECK, JR.

*Attesting Officer*  *Commissioner of Patents and Trademarks*